US012060015B2

(12) United States Patent
Schneebauer et al.

(10) Patent No.: US 12,060,015 B2
(45) Date of Patent: Aug. 13, 2024

(54) DECORATIVE ELEMENT FOR A VEHICLE HAVING A SEMITRANSPARENT ELEMENT, A LIGHT GUIDING ELEMENT, AND A MOLDING COMPOUND LAYER

(71) Applicant: Bayerische Motoren Werke Aktiengesellschaft, Munich (DE)

(72) Inventors: Martin Schneebauer, Munich (DE); Bernd Veihelmann, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/035,774

(22) PCT Filed: Jan. 28, 2022

(86) PCT No.: PCT/EP2022/052134
§ 371 (c)(1),
(2) Date: May 8, 2023

(87) PCT Pub. No.: WO2022/167349
PCT Pub. Date: Aug. 11, 2022

(65) Prior Publication Data
US 2024/0010137 A1 Jan. 11, 2024

(30) Foreign Application Priority Data
Feb. 4, 2021 (DE) ............. 10 2021 102 565.6

(51) Int. Cl.
*B60R 13/00* (2006.01)
*B32B 3/30* (2006.01)
(Continued)

(52) U.S. Cl.
CPC ............. *B60R 13/005* (2013.01); *B32B 3/30* (2013.01); *B32B 27/08* (2013.01); *B32B 27/283* (2013.01);
(Continued)

(58) Field of Classification Search
CPC ................. B60R 13/005; B60Q 1/26
See application file for complete search history.

(56) References Cited

U.S. PATENT DOCUMENTS 11,427,137 B2 * 8/2022 Studeny ............ B60R 13/005
2018/0215086 A1 8/2018 Geise
(Continued)

FOREIGN PATENT DOCUMENTS

DE 10 2014 018 625 A1 6/2016
DE 10 2016 007 119 A1 2/2017
(Continued)

OTHER PUBLICATIONS

International Search Report (PCT/ISA/210) issued in PCT Application No. PCT/EP2022/052134 dated May 4, 2022 with English translation (four (4) pages).
(Continued)

Primary Examiner — Robert J May
(74) Attorney, Agent, or Firm — Crowell & Moring LLP

(57) ABSTRACT

A decorative element for a vehicle includes a partially transparent element having light-permeable portions and light-impermeable portions, and a light-guiding element which is configured to couple out, at least in some portions in the direction of the partially transparent element, light which has been coupled in. The partially transparent element and the light-guiding element are permeable for radar beams. A molding material layer is arranged between the partially transparent element and the light-guiding element, and is permeable for the light coupled out from the light-guiding element and for the radar beams. The molding material layer connects the partially transparent element to the light-guiding element.

15 Claims, 1 Drawing Sheet

(51) Int. Cl.
  *B32B 27/08* (2006.01)
  *B32B 27/28* (2006.01)
  *F21V 8/00* (2006.01)
  *G01S 7/02* (2006.01)

(52) U.S. Cl.
  CPC .............. *G01S 7/027* (2021.05); *G02B 6/005* (2013.01); *G02B 6/0065* (2013.01); *B32B 2255/10* (2013.01); *B32B 2255/20* (2013.01); *B32B 2255/26* (2013.01); *B32B 2255/28* (2013.01); *B32B 2307/41* (2013.01); *B32B 2307/412* (2013.01); *B32B 2451/00* (2013.01); *B32B 2605/00* (2013.01)

(56) References Cited

U.S. PATENT DOCUMENTS

| | | |
|---|---|---|
| 2019/0103042 A1 | 4/2019 | Schoene et al. |
| 2022/0024374 A1 | 1/2022 | Studeny et al. |

FOREIGN PATENT DOCUMENTS

| | | |
|---|---|---|
| DE | 10 2017 124 355 A1 | 4/2018 |
| DE | 10 2017 201 660 A1 | 8/2018 |
| DE | 10 2017 214 129 A1 | 2/2019 |
| DE | 10 2017 217 507 A1 | 4/2019 |
| DE | 10 2018 220 997 A1 | 6/2020 |
| WO | WO 2020/114969 A1 | 6/2020 |

OTHER PUBLICATIONS

German-language Written Opinion (PCT/ISA/237) issued in PCT Application No. PCT/EP2022/052134 dated May 4, 2022 (four (4) pages).

German-language Search Report issued in German Application No. 10 2021 102 565.6 dated Jul. 7, 2021 with partial English translation (11 pages).

* cited by examiner

DECORATIVE ELEMENT FOR A VEHICLE HAVING A SEMITRANSPARENT ELEMENT, A LIGHT GUIDING ELEMENT, AND A MOLDING COMPOUND LAYER

BACKGROUND AND SUMMARY OF THE INVENTION

The present invention relates to a decorative element for a vehicle. The decorative element includes a semitransparent element, which includes light-transmissive sections and light-opaque sections, and a light-guiding element designed to decouple coupled-in light at least in sections in the direction of the semitransparent element, wherein the semitransparent element and the light-guiding element are transmissive to radar beams. Furthermore, the invention relates to a vehicle having such a decorative element.

A decorative element of the type mentioned at the outset is used to provide a vehicle with a high-quality appearance and an individual look. Decorative elements are thus used both in the interior of a vehicle and for the exterior of a vehicle. In the interior, decorative elements having a light source arranged on the rear are increasingly used, which serve as an ambient light. For the exterior, metallically coated decorative elements are increasingly used, in which light sources, such as LEDs, are arranged directly behind the metallic coating.

DE 10 2017 214 129 A1 describes a radar-capable light emblem for a vehicle, which includes a flat light guide having decoupling structures, via which light can be decoupled from the flat light guide at least in sections at a decoupling side, a light source, which is capable of coupling light into the flat light guide, a housing, in which the flat light guide is arranged, and at least one technical means for the monitoring the surroundings of the vehicle in the form of a radar sensor, which is arranged on a side of the flat light guide facing away from the decoupling side and the direction of action of which extends through the decoupling side of the flat light guide. A lens is arranged at least in sections in front of the decoupling side, which terminates the housing, and an element that is light-opaque in sections extends between the lens and the decoupling side, wherein the flat light guide, the element light-opaque in sections, and the lens are at least fractionally transmissive for radar radiation. The lens and the light-opaque element are formed as a composite component, wherein an air layer is present between the composite component and the flat light guide.

The present invention is based on the object of providing a decorative element and a vehicle which enable improved light decoupling and improved radar transmittance.

This object is achieved by the claimed decorative element and vehicle.

According to one aspect, a decorative element is proposed for a vehicle, in particular for the exterior of a vehicle. The decorative element includes a semitransparent element, which includes light-transmissive sections and light-opaque sections, and a light-guiding element designed to decouple coupled-in light at least in sections in the direction of the semitransparent element, wherein the semitransparent element and the light-guiding element are transmissive to radar beams, characterized in that a molding compound layer is arranged between the semitransparent element and the light-guiding element, which is transmissive to the light decoupled from the light-guiding element and to radar beams and which connects the semitransparent element and the light-guiding element to one another.

Due to the provision of a molding compound layer instead of an air layer, the decorative element has improved transmittance for radar radiation due to a lower phase shift and lossless light decoupling and thus an improved light guiding function. As a result, the decorative element has an improved appearance both in the cold appearance and also during the illumination. In addition, a simple and cost-effective connection of the semitransparent element and the light-guiding element is provided. The light guiding function by the molding compound layer is produced by a jump in the index of refraction.

The decorative element can also be designated in the present case as an ornamental element or design panel. The decorative element can be used both in the interior of a vehicle and on the exterior of a vehicle. The decorative element is preferably used on the exterior of a vehicle. Since all elements of the decorative element are transmissive to radar beams and the relative permittivity of the materials is closely matched with one another, the decorative element can be installed in front of a radar.

Light is fed or coupled into the light-guiding element to generate an illumination function, wherein the light is decoupled at correspondingly provided points of the light-guiding element in the direction of the semitransparent element. The decoupled light subsequently passes through the molding compound layer and through the light-transmissive sections of the semitransparent element. An illuminated appearance, such as an emblem, can be provided by a corresponding arrangement of light-transmissive sections and light-opaque sections.

The light-guiding element can have a coupling surface for coupling in light. The coupling surface is preferably arranged on an end face of the light-guiding element.

The semitransparent element and the light-guiding element are advantageously constructed in multiple layers. Furthermore, all layers are advantageously materially bonded to one another.

The molding compound layer can be a transparent or slightly scattering molding compound. The molding compound layer can also be designated in the present case as optical bonding. The molding compound layer can have a thickness between approximately 1 mm and approximately 2 mm.

The molding compound layer is advantageously made of silicone. Silicone ensures lossless light decoupling. Moreover, silicone enables a cost-effective connection of the semitransparent element and the light-guiding element.

In one advantageous embodiment, the molding compound layer materially bonds the semitransparent element and the light-guiding element to one another.

In one advantageous embodiment, the molding compound layer has an index of refraction which is less than an index of refraction of the light-guiding element and/or the semitransparent element. In this way, analogously to the principle of a light guide, a total reflection at the boundary surface of the multilayer composite and thus low-loss light guiding are produced. The index of refraction of the semitransparent element and the light-guiding element is advantageously approximately 1.58, and the index of refraction of the molding compound layer is approximately 1.4.

In one advantageous embodiment, the semitransparent element includes a semiconducting layer, which is arranged on a surface of the semitransparent element facing toward the molding compound layer. The part of the decorative element thus produced therefore has a certain residual transparency to visible light in the light-transmissive sections, which is primarily determined by the semiconducting layer, in particular the metallization of the semiconducting layer. This transparency is preferably between approximately 10% and approximately 30%. The semiconducting layer thus provides the decorative element with a metallic look, in particular a chrome look on the front side. The semiconducting layer therefore creates a metallic look both in the cold appearance and also during the illumination. In the cold appearance, that is to say when the design element is not illuminated, the color of the semitransparent element appears toward the outside in the light-opaque sections, on the one hand, and the semiconducting layer is visible toward the outside in the light-transmissive sections. The semiconducting layer is advantageously transmissive to radar beams. The semiconducting layer is advantageously arranged both on the light-transmissive sections and on the light-opaque sections. Furthermore, the semiconducting layer is advantageously arranged only on the light-transmissive sections. In one advantageous embodiment, the semiconducting layer is applied to the surface of the semitransparent element facing toward the molding compound layer, in particular applied by vapor deposition. The semiconducting layer can also be designated as a metallization.

In one advantageous embodiment, the semiconducting layer is made of silicon or indium. The semiconducting layer advantageously includes, in addition to silicon or indium, a very small proportion of aluminum or chromium, if this is not avoidable for optical reasons.

In one advantageous embodiment, the semitransparent element includes a first transparent layer made of a first plastic. The first plastic is advantageously made of polycarbonate, polyamide, or a transparent PMMA. The first transparent layer is advantageously transmissive to radar beams. Furthermore, the first transparent layer advantageously has an index of refraction of approximately 1.58. The first transparent layer can have a layer thickness between approximately 3.5 mm and approximately 5 mm.

In one advantageous embodiment, depressions are introduced into a surface of the transparent layer facing toward the molding compound layer, into which corresponding projections of the molding compound layer are inserted. The depressions in the first transparent layer create a three-dimensional structure and impression to the outside. The projections of the molding compound layer fill the depressions in the connected state. In one advantageous embodiment, the semiconducting layer is arranged between the depressions of the transparent layer and the projections of the molding compound layer.

In one advantageous embodiment, the semitransparent element includes a light-opaque layer, which is arranged at least in sections on a surface of the semitransparent element facing toward the light-guiding element and which forms the light-opaque sections. The light-opaque layer ensures that no light can pass through the first transparent layer. The light-opaque layer preferably does not contain any metallic or conductive components and advantageously has a layer thickness of <12 µm. The light-opaque layer can be applied by printing, applying foil, or lacquering with subsequent laser processing. In one advantageous embodiment, the light-opaque layer is arranged on projections of the transparent layer, in particular applied. The semiconducting layer can be arranged on the light-opaque layer and the first transparent layer, in particular applied. The light-opaque layer is advantageously transmissive to radar beams.

In one advantageous embodiment, the semitransparent element includes a first lacquer layer, which is arranged on a surface of the semitransparent element facing away from the molding compound layer. The first lacquer layer forms the outer skin of the decorative element. The first lacquer layer is advantageously a transparent protective lacquer layer. Furthermore, the first lacquer layer advantageously has an index of refraction similar to the transparent layer. The first lacquer layer can also be designated in the present case as a protective lacquer layer. The first lacquer layer is advantageously a multicomponent lacquer system, in particular a lacquer system based on polyurethane or siloxane. Furthermore, the first lacquer layer has a layer thickness between approximately 10 µm and approximately 0.7 mm. The first lacquer layer is advantageously transmissive to radar beams.

In one advantageous embodiment, the light-guiding element includes a light-guiding layer. When light is coupled into the light-guiding layer, the light beams are reflected at the inner wall of the light-guiding layer and decoupled from the light-guiding layer at certain points. The light-guiding layer advantageously directly abuts the molding compound layer. The light-guiding layer is advantageously transmissive to radar beams. Furthermore, the light-guiding layer advantageously has a thickness between approximately 2 mm and approximately 3 mm. The light-guiding layer can have an index of refraction of approximately 1.58.

In one advantageous embodiment, the light-guiding element has a decoupling structure on a surface facing away from the molding compound layer. The decoupling structure is used to decouple the light in the direction of the molding compound layer and the semitransparent element. The decoupling structure can be provided over the entire length of the light-guiding element or in sections. The decoupling structure is advantageously opposite to the light-transmissive sections of the semitransparent element and the semiconducting layer arranged thereon, so that the light is decoupled forward and thus illuminates these areas. When light is coupled into the light-guiding layer, the light beams are reflected at the inner wall of the light-guiding element until they are incident on the decoupling structure and exit from the light-guiding layer. The decoupling structures are advantageously formed as a lacquer layer, which can be applied by way of printing to the light-guiding layer. Furthermore, the light-guiding layer advantageously includes the decoupling structure on a surface facing away from the molding compound layer. That is to say, the decoupling structure is connected to the light-guiding layer, in particular the decoupling structure is applied to the light-guiding layer.

In one advantageous embodiment, the light-guiding element includes a second transparent layer made of a second plastic, which adjoins the decoupling structure. The second transparent layer is used to keep the light guiding efficient, in that the second transparent layer has an index of refraction which is less than the index of refraction of the light-guiding layer. The index of refraction of the second transparent layer is advantageously approximately 1.4. The second transparent layer can also be designated in the present case as a low index coating. The layer thickness of the second transparent layer is advantageously between approximately 5 µm and approximately 10 µm. The second transparent layer is advantageously transmissive to radar beams. The second transparent layer can be a transparent protective lacquer layer, for example a polyurethane or siloxane lacquer.

In one advantageous embodiment, the light-guiding element includes a second lacquer layer, which is arranged on a surface of the second transparent layer facing away from the light-guiding layer. The second lacquer layer is designed as a light-opaque protective lacquer. The second lacquer layer advantageously has a layer thickness of approximately 30 µm. Furthermore, the second lacquer layer is advantageously made of polyurethane or epoxy. The second lacquer layer preferably faces toward the vehicle interior. Furthermore, the second lacquer layer is advantageously transmissive to radar beams.

In one advantageous embodiment, a light source is provided, which couples light into the light-guiding element. The light source advantageously comprises at least one light-emitting diode (LED) or a light guide element fed with light. An energy-efficient and space-saving illumination can be generated by the use of a light-emitting diode. In one advantageous embodiment, the light source includes multiple light-emitting diodes. The light-emitting diodes can advantageously have different colors, which can be activated individually. The light-emitting diode can thus comprise a red, green, and blue light-emitting diode. Such a light-emitting diode is designated as an RGB-LED. In one advantageous embodiment, the light source includes an organic light-emitting diode (OLED).

In one advantageous embodiment, at least one seal element is arranged between the semitransparent element and the molding compound layer. The seal element prevents moisture from entering between the semitransparent element and the molding compound layer. The seal element is advantageously made of plastic or an elastomer. A seal element can advantageously be arranged in each case on an end face of the decorative element between the semitransparent element and the molding compound layer.

According to a further aspect, a vehicle is proposed having at least one such decorative element. The vehicle has lossless light decoupling and thus a high-quality appearance due to the use of the decorative element.

A decorative element, a vehicle, and further features and advantages are explained in more detail hereinafter on the basis of an exemplary embodiment, which is schematically shown in the figures.

DETAILED DESCRIPTION OF THE DRAWINGS

Figure 1:
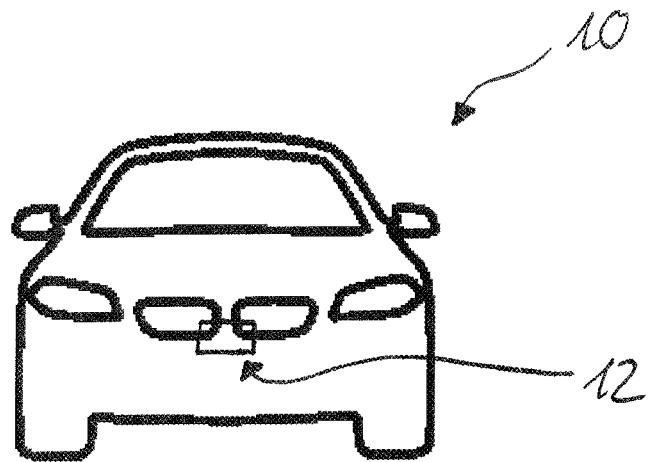
FIG. 1 shows a schematic illustration of a vehicle having a decorative element.

A vehicle 10 is shown in FIG. 1, the exterior of which is provided with a decorative element 12.

Figure 2:
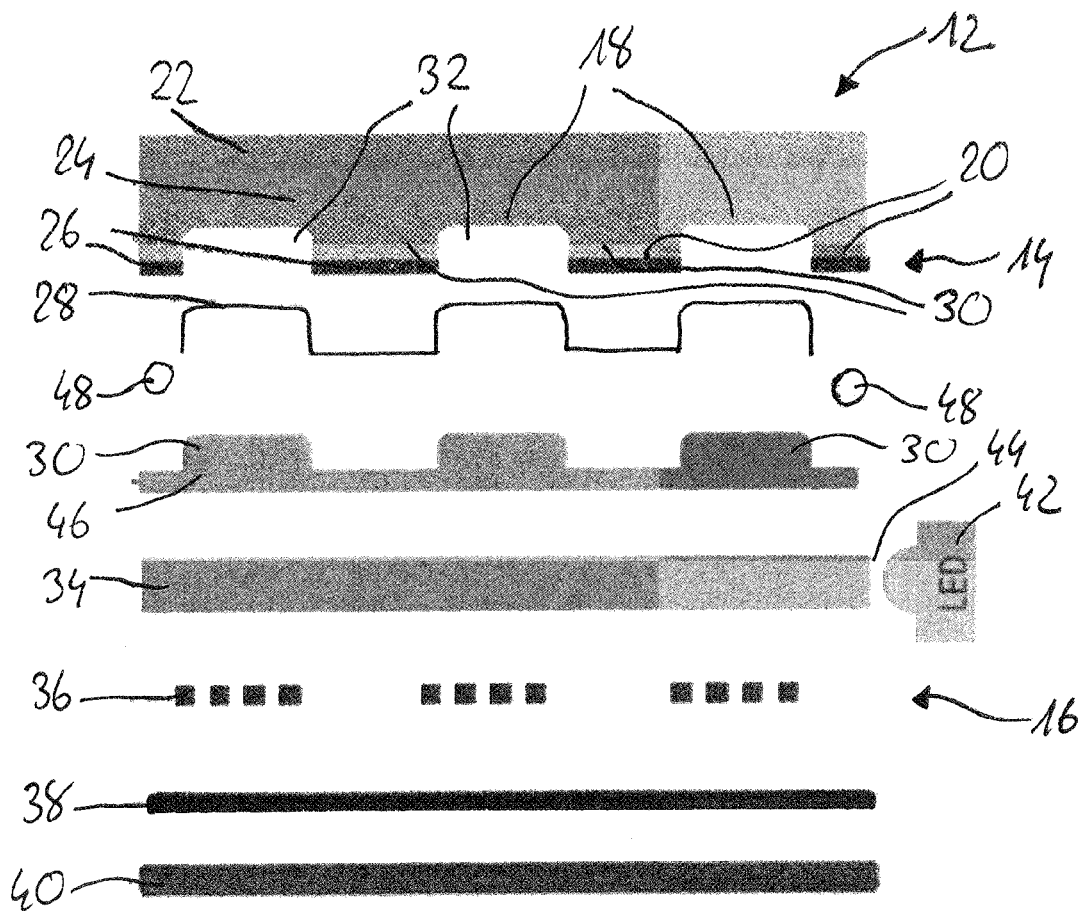
FIG. 2 shows a cross section through the layer structure of the decorative element.

As is apparent in FIG. 2, the decorative element 12 includes a semitransparent element 14 and a light-guiding element 16, which are constructed in multiple layers and are connected to one another via a molding compound layer 46. All layers are transmissive to radar beams. The decorative element 12 can thus also be installed in front of a radar.

The semitransparent element 14 includes light-transmissive sections 18 and light-opaque sections 20, wherein the semitransparent element 14 includes a first lacquer layer 22 forming an outer surface, a first transparent layer 24, a light-opaque layer 26, and a semiconducting layer 28, wherein all layers of the semitransparent element 14 are materially bonded to one another.

The first lacquer layer 22 forms the outer skin of the decorative element 12 and is a transparent lacquer layer. The first lacquer layer 22 is a multicomponent lacquer system, in particular a lacquer system based on polyurethane or siloxane. The first lacquer layer 22 has a layer thickness between approximately 10 μm and approximately 0.7 mm.

The first lacquer layer 22 has an index of refraction which corresponds to that of the transparent layer 24.

The first transparent layer 24 is made of polycarbonate, polyamide, or a transparent PMMA and has a layer thickness between approximately 3.5 mm and approximately 5 mm. The index of refraction of the transparent layer 24 is approximately 1.58.

As is apparent in FIG. 2, the first transparent layer 24 includes projections 30 and depressions 32 on a surface facing away from the first lacquer layer 22. The depressions 32 create a three-dimensional impression to the outside and form the light-transmissive sections 18.

The light-opaque layer 26, which creates the light-opaque sections 20, is applied to the projections 30. The light-opaque layer 26 is a coloring layer, which is applied to the projections 30 by printing, applying foil, or lacquering with subsequent laser processing. The light-opaque layer 26 preferably does not contain any metallic or conductive components and has a layer thickness of <12 μm.

The semiconducting layer 28 is applied to the transparent layer 24 and the light-opaque layer 26. The semiconducting layer 28 creates a metallic look, in particular a chrome look, on the front side of the decorative element 12. The semiconducting layer 28 is applied in a vapor deposition process to the transparent layer 24 and the light-opaque layer 26. The semiconducting layer 28 has a certain residual transparency to visible light in the light-transmissive sections 18, which is primarily determined by the metallization. The transparency to visible light is typically between approximately 10% and 30%. The semiconducting layer 28 can also be designated as a metallization and is made of silicon or indium with a small component of aluminum or chromium.

As is furthermore apparent in FIG. 2, the light-guiding element 16 includes a light-guiding layer 34, a decoupling structure 36, a second transparent layer 38, and a second lacquer layer 40, wherein all layers and the decoupling structure are materially bonded to one another.

The light-guiding layer 34 is used to decouple coupled-in light in the direction of the semitransparent element 14, in particular in the direction of the light-opaque sections 18. The light-guiding layer 34 has a thickness between approximately 2 mm and approximately 3 mm and an index of refraction of approximately 1.58.

The coupling of light into the light-guiding layer 34 is carried out by way of a light source 42, which couples light via a coupling surface 44 into the light-guiding layer 34. The light source 42 is a light-emitting diode (LED) in the present case. The thickness of the light-guiding layer 34 is between approximately 2 mm and approximately 3 mm.

The decoupling structure 36 is arranged opposite to the light-transmissive sections 18, wherein the decoupling structure 36 is a punctuated lacquer layer, such as white lacquer spots, which is applied to a surface of the light-guiding layer facing away from the semitransparent element 14. As is apparent in FIG. 2, the decoupling structure 36 is applied to the light-guiding layer 34 in the areas which are opposite to the light-transmissive sections 18. The light coupled into the light-guiding layer 34 is thus initially reflected at the inner walls of the light-guiding layer 34, and as soon as the light is incident on the decoupling structure 36, the light is decoupled in the direction of the semitransparent element 14, in particular in the direction of the light-transmissive sections 18, and thus illuminates these areas.

The second transparent layer 38 is a transparent coating made of polyurethane or siloxane lacquer and has a layer thickness between approximately 5 μm and approximately 10 μm. The second transparent layer 38 can also be designated as a low index coating. The second transparent layer 38 is used to keep the light guiding efficient in that it has an index of refraction which is less than the index of refraction of the light-guiding layer 34. The index of refraction of the second transparent layer 38 is approximately 1.4.

The second lacquer layer 40 is applied to the second transparent layer 38 and thus faces toward the vehicle interior. The second lacquer layer 40 is a light-opaque protective lacquer made of polyurethane or epoxy. The layer thickness of the second lacquer layer 40 is approximately 30 µm.

As is apparent in FIG. 2, the semitransparent element 14 and the light-guiding element 16 are connected to one another, in particular materially bonded to one another, via the molding compound layer 46. The molding compound layer 46 can also be designated in the present case as optical bonding. The molding compound layer 46 has a lower index of refraction than the light-guiding layer 34. The index of refraction of the molding compound layer is preferably approximately 1.4. The molding compound layer is made of silicone and has a layer thickness between approximately 1 mm and approximately 2 mm.

The molding compound layer 46 includes projections 30 corresponding to the depressions 32, which are inserted in a formfitting manner into the depressions 32 in the connected state. The molding compound layer 46 thus compensates for the depressions 32 of the first transparent layer 24.

To prevent the entry of moisture into the layer structure, in particular between the semitransparent element 14 and the molding compound layer 46, seal elements 48 are provided, which are arranged between the light-opaque layer 26 and the molding compound layer 46 at the end faces of the decorative element 12. The seal elements 48 are made of plastic or rubber.

The decorative element 12 is distinguished in that the semitransparent element 14 and the light-guiding element 16 are connected to one another via a molding compound layer 46, the index of refraction of which is less than the indices of refraction of the transparent layer 24 and the light-guiding layer 34. Lossless decoupling of the light is thus enabled. In addition, all layers and materials used are transmissive to radar beams, so that the decorative element 12 can be used in front of a radar of a vehicle.

LIST OF REFERENCE NUMERALS 10 vehicle
12 decorative element
14 semitransparent element
16 light-guiding element
18 light-transmissive sections
20 light-opaque sections
22 first lacquer layer
24 first transparent layer
26 light-opaque layer
28 semiconducting layer
30 projection
32 depression
34 light-guiding layer
36 decoupling structure
38 second transparent layer
40 second lacquer layer
42 light source
44 coupling surface
46 molding compound layer
48 seal element

The invention claimed is:

1. A decorative element for a vehicle, the decorative element comprising:
   a semitransparent element, which includes light-transmissive sections and light-opaque sections,
   a light-guiding element, which is configured to decouple coupled-in light at least in sections in a direction of the semitransparent element, and
   a molding compound layer arranged between the semitransparent element and the light-guiding element, wherein the molding compound layer is transmissive to light decoupled from the light-guiding element and to radar beams, and connects the semitransparent element and the light-guiding element to one another,
   wherein the semitransparent element and the light-guiding element are transmissive to the radar beams.

2. The decorative element according to claim 1, wherein the molding compound layer is made of silicone.

3. The decorative element according to claim 1, wherein the semitransparent element includes a semiconducting layer arranged on a surface of the semitransparent element facing toward the molding compound layer.

4. The decorative element according to claim 3, wherein the semiconducting layer is made of silicon or indium.

5. The decorative element according to claim 1, wherein the semitransparent element includes a first transparent layer made of a first plastic.

6. The decorative element according to claim 5, wherein depressions are introduced into a surface of the first transparent layer facing toward the molding compound layer, and corresponding projections of the molding compound layer are inserted into the depressions.

7. The decorative element according to claim 1, wherein the semitransparent element includes a light-opaque layer that is arranged at least in sections on a surface of the semitransparent element facing toward the molding compound layer and forms the light-opaque sections.

8. The decorative element according to claim 1, wherein the semitransparent element includes a first lacquer layer arranged on a surface of the semitransparent element facing away from the molding compound layer.

9. The decorative element according to claim 1, wherein the light-guiding element includes a light-guiding layer.

10. The decorative element according to claim 1, wherein the light-guiding element includes a decoupling structure on a surface facing away from the molding compound layer.

11. The decorative element according to claim 10, wherein the light-guiding element includes a second transparent layer that is made of a second plastic and adjoins the decoupling structure.

12. The decorative element according to claim 11, wherein the light-guiding element includes a second lacquer layer arranged on a surface of the second transparent layer facing away from the light-guiding layer.

13. The decorative element according to claim 1, further comprising a light source that couples light into the light-guiding element.

14. The decorative element according to claim 1, further comprising at least one seal element between the semitransparent element and the molding compound layer.

15. A vehicle comprising the decorative element according to claim 1.

* * * * *